United States Patent [19]

Golden

[11] 4,200,730
[45] Apr. 29, 1980

[54] CHEMICAL MODIFICATION OF MICROSCOPIC OPACIFYING PARTICLES

[75] Inventor: Ronald Golden, Louisville, Ky.

[73] Assignee: Champion International Corporation, Stamford, Conn.

[21] Appl. No.: 965,323

[22] Filed: Dec. 1, 1978

[51] Int. Cl.$^2$ .............................................. C08G 14/02
[52] U.S. Cl. ................................ 525/398; 260/29.4 R; 428/526; 528/232; 528/241; 528/259; 525/509
[58] Field of Search ................... 260/29.4 R; 528/231, 528/259, 266, 232, 241, 242, 243; 428/526

[56] References Cited

U.S. PATENT DOCUMENTS

| | | | |
|---|---|---|---|
| 3,112,293 | 11/1963 | Dickstein et al. | 528/231 X |
| 3,547,868 | 12/1970 | Schwartzenburg et al. | 528/231 X |
| 4,035,328 | 7/1977 | Huang et al. | 260/29.4 R |
| 4,064,088 | 12/1977 | Renner | 260/29.4 R X |

*Primary Examiner*—Lucille M. Phynes
*Attorney, Agent, or Firm*—Evelyn M. Sommer

[57] ABSTRACT

Microscopic opacifying particles formed of a formaldehyde condensation product are chemically modified to impart anionic-, cationic- or hydroxy-functional groups thereto in order to provide improved dye receptivity, dispersibility and compatibility properties.

14 Claims, 1 Drawing Figure

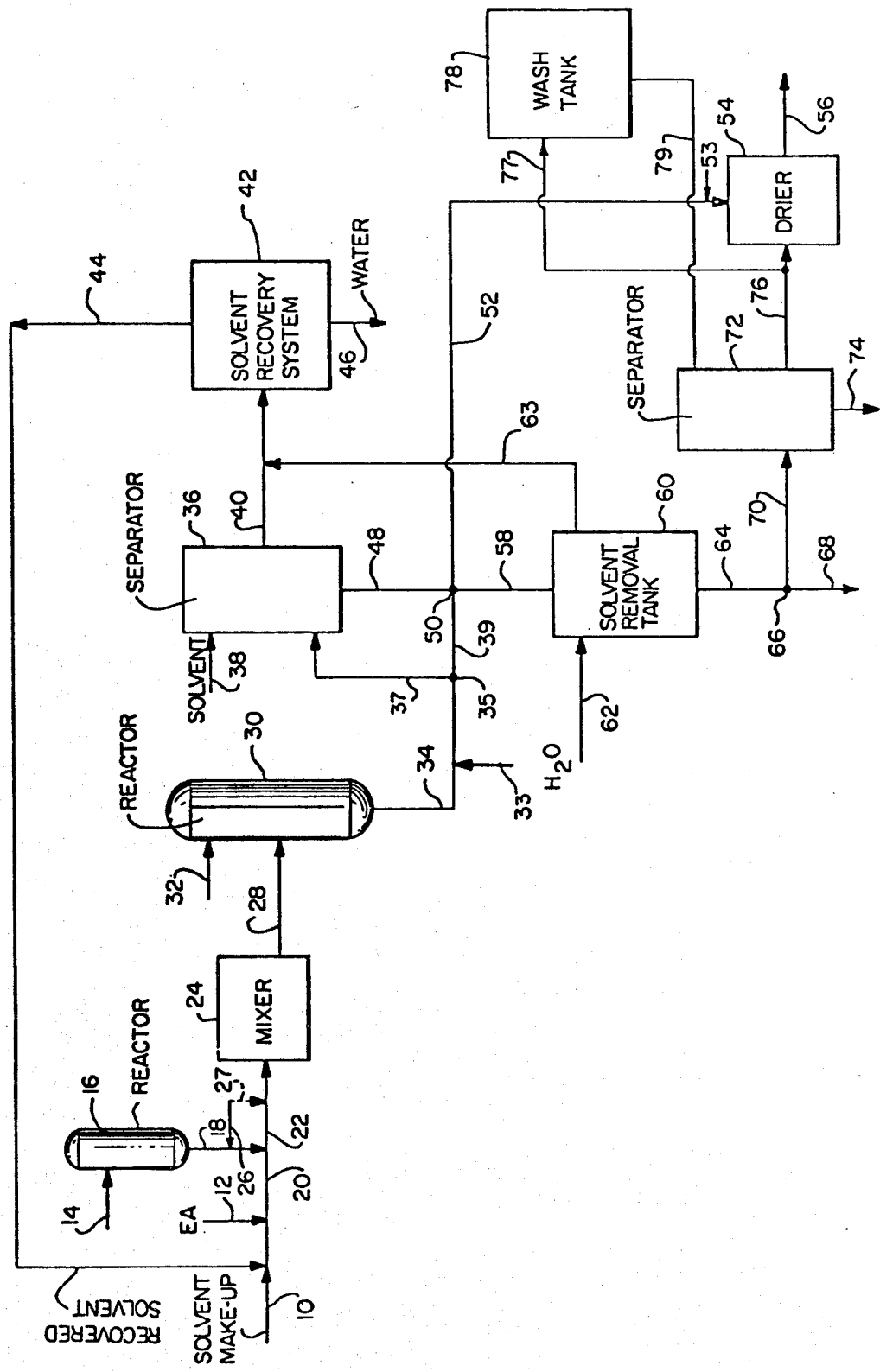

CHEMICAL MODIFICATION OF MICROSCOPIC OPACIFYING PARTICLES

This invention relates to a process for the preparation of chemically modified, opaque, substantially spherical, microscopic opacifying particles, and to the particles produced by such process. More specifically, this invention relates to the preparation of chemically modified, opaque, substantially spherical particles formed of a formaldehyde condensation product and to spherical agglomerates of such particles which have improved properties.

The preparation of opaque, substantially spherical microscopic opacifying particles is described in U.S. Pat. No. 4,058,434, issued Nov. 15, 1977, to David N. Vincent and Ronald Golden.

The Vincent and Golden application describes the production of substantially spherical, solid, opaque polymeric particles by a process involving emulsification.

It has been discovered that opaque, polymeric particles can be provided having improved dye receptivity, dispersibility and compatability by the process of the present invention.

According to the processes of the present invention, a substantially water insoluble modifying agent is provided which can react with the aldehyde condensation polymer to impart anionic-, cationic- or free hydroxy-functional groups to the polymer. The modifying agent is added during the formation of such microscopic particles and agglomerates to provide "tailor-made" opacifying agents having the anionic, cationic- or free hydroxy-functional properties desired depending upon the particular usage contemplated for such particles, as hereinafter described.

The modifying agents utilized in the processes of the present invention are compounds which are capable of reacting with the aldehyde condensation product and additionally have at least one cationic-, anionic- or free hydroxyl-functional moiety. According to one embodiment of the present invention, the modifying agent is added to an aldehyde prepolymer-in-oil emulsion prior to the addition of an amphiphilic acid catalyst.

According to another embodiment of the present invention, the modifying agent is added after the formation of the substantially spherical particles, but before the agglomeration of the particles.

As mentioned previously, it is desired to impart anionic-, cationic- or hydroxy-functional groups to the opacifying agent. Modifying agents which will impart anionic-functional groups to the opacifying agent include: amino or hydroxy sulfonate compounds, such as 7-amino-1,3-naphthalenedisulfonic acid; amino or hydroxy aromatic phosphate compounds such as pyridoxamine 5-phosphate amino or hydroxy aromatic borate compounds such as m-aminophenylboronic acid; amino or hydroxy aromatic carboxylate compounds such as paraaminobenzoic acid, glutaric acid, glycolic acid or tartaric acid; amino acids such as glycine and glutamic acid; sulfate esters such as sodium lauryl sulfate; and proteinaceous materials such as gelatin.

Modifying agents which will impart cationic-functional groups to the opacifying agents include amino containing compositions such as melamine, guanidine, guanidine nitrate, aminopyridine, alkylated aminopyridine, alkylated aminopyridinium salts, amino quinolines, pyrrolidines and the like.

Modifying agents which will impart hydroxy-functional groups to the opacifying agents include monomeric and polymeric polyhydroxy compounds such as glycerine, pentaerythritol, polyvinylalcohols, starches, methylcellulose, polysaccharides, 1,4-pentanediol and the like.

The modifying agent may be used in amounts ranging from 0.01 to 20 percent based on the weight of the polymeric particles, preferably between about 0.5 and about 10 percent based on the weight of the polymeric particles.

An additional understanding of the invention will appear from the following description and drawing, which is a flowsheet illustrating the process of the present invention.

Referring now to the drawing, a water-immiscible oily liquid is introduced by means of line 10 for admixture with recycled oily material and a surface-active emulsifying agent 12. Suitable water-immiscible oily materials for use in the present invention include, for example, any organic solvent capable of acting as the continuous phase of a water-in-oil emulsion. Suitable solvents include aliphatic and aromatic solvents, such as petroleum ethers, naphthas, mineral spirits, toluene, xylene, turpentine or the like. Similarly, ketones, esters, halogenated hydrocarbons, etc., may be suitable utilized in the process of the present invention. The preferred solvents are those having a relatively low cost and a low toxicity, such as mineral spirits or xylene.

The emulsifying agent is admixed with oily material in amounts sufficient to provide, for example, between about 0.005 and about 0.2 part by weight of emulsifying agent per part of oily material, preferably between about 0.02 and about 0.08 part per part of oily material.

Suitable surface-active emulsifying agents are those capable of promoting the formation of a water-in-oil emulsion. Such materials include, for example, lanolin, lanolin derivatives, sorbitan monooleate, polyol oleates, ethylene oxide adducts of fatty acids, fatty alcohols, fatty amines and fatty amides, cholesterol derivatives, fatty acid diethanolamines, ethylene oxide-propylene oxide block copolymeric condensation products and the like, such surface-active agents being well known in the art. The preferred emulsifying agents are the ethylene oxide-propylene oxide block copolymeric condensation products commercially available from BASF-Wyandotte Corporation under the names "Pluronic" and "Tetronic".

Meanwhile, a urea-formaldehyde prepolymer is provided by introducing urea and formaldehyde by means of line 14 into reactor 16 at a mole ratio of formaldehyde to urea in the range of between about 1:1 to 2.5:1, preferably between about 1.2:1 and 1.5:1. The reaction takes place in the aqueous solution at about 50% solids, at a pH of 9–10, and a temperature between about 50 and 120° C. The reaction time is controlled so as to produce a substantially clear prepolymer solution when the reaction mixture is cooled to room temperature. Such reactions are well known in the art. Although the foregoing discussion has been directed towards a urea-formaldehyde prepolymer, any suitable partially condensed aldehyde condensation product may be employed for the formation of an internal phase of the emulsion. Accordingly, for example, any carbamide aldehyde condensation product that is compatible with aqueous solution polymerization is suitable for use in the present invention. Accordingly, other acid or base-catalyzed coreactants may be employed including condensation reaction products of formaldehyde with phenols, such as, hydroxybenzene (phenol) m-cresol and 3,5-xylenol carbamides, such as, urea; triazines, such as, melamine; amino and amido compounds, such as, aniline, p-toluenesulfonamide, ethyleneurea and guanidine; ketones, such as, acetone and cyclohexanone, or combinations of these materials, with the provision that the prepolymer be insoluble in the water-immiscible phase. Additionally, the prepolymer may be provided in any suitable aqueous medium including water, glycerol, poly(ethyleneoxide), glycols, or the like, may be suitable employed. Urea-formaldehyde is the preferred prepolymer. However, the substitution of melamine for 1 to 2% by weight of urea provides a prepolymer with better storage stability. The expression "prepolymer" as utilized herein is intended to mean the initial, water soluble, reaction product of the carbamide and the aldehyde. In the case of urea and formaldehyde, the prepolymer includes methylol ureas and the oligomers of methylol ureas.

The prepolymer in the aqueous medium is withdrawn from the reactor 16 by means of line 18 and admixed with the water-immiscible solvent-emulsifying agent mixture in line 20, and the resulting admixture is passed by means of line 22 into mixer 24 wherein a water-in-oil emulsion is formed under conditions of brisk agitation. The water-in-oil emulsion may be prepared batchwise, utilizing a tank with a high shear agitation, or continuously by combining the oil and water phases into an in-line mixer, e.g., a Homomixer or Sonulator. Preferably, the agitation is conducted in a manner such that the emulsion droplets have an average particle diameter below about 5 microns, preferably in the range of between about 0.5 and about 2 microns. Alternatively, a suitable inorganic opacifying pigment, such as $TiO_2$, $Al_2O_3$, barytes ($BaSO_4$), clay, ZnO, ZnS, $Ca(SO_4)_2$, talc, or a dye such as and the like may be provided in the emulsion. Preferred inorganic pigments for the purpose of the present invention are $TiO_2$, $Al_2O_3$, $BaSO_4$, clay and ZnO, with $TiO_2$ being especially preferred.

The addition of the inorganic pigment particles or dye by means of line 26 results in the incorporation of the pigment into the ultimate structure of the opacifying particles of the present invention. Alternatively, the inorganic pigment or dye may be added to the emulsion by means of line 27 where it migrates to the oil/water interface. When the particles of the present invention are ultimately formed, as hereinafter described, the inorganic opacifying pigment or dye becomes incorporated in the polymeric structure at a point depending upon its position during the polymerization step, e.g., at the particle-solvent interface or homogeneously distributed throughout the polymer phase.

Although it is possible to incorporate an inorganic pigment particle into the structure of the polymeric particles of the present invention, highly opaque particles may be provided in the absence of such inorganic pigment particles. Accordingly, since the resulting polymeric pigment is opaque and not transparent, the practice of the present invention may be conducted without the use of the aforesaid inorganic opacifying pigments.

The ratio of the internal, aqueous phase, to the external, water-immiscible solvent phase, is preferably in the range of between about 0.04 and about 3 parts by weight, preferably between about 1 to 2 parts by weight of the internal phase per part by weight of the external phase. Although it is possible to utilize a higher ratio of internal to external phase, it is preferred to use an approximately 2 to 1 ratio. The resulting emulsion that is withdrawn from the mixer 24 by means of line 28 having a viscosity in the range of between about 2 and 2000 centipoises. Preferably, the viscosity of the resulting emulsion is low and water-like.

The modifying agent may next be added by way of line 27. Advantageously, the water insoluble modifying agent should be either an oil soluble or an amphiphilic material, i.e., a material having some significant affinity for both the aqueous hydrophilic property and some significant affinity for the oily phase (oleophilic) of the emulsion, in which the polar, hydrophilic, portion of the material can react with the aldehyde condensation polymer or prepolymer.

In some cases, depending upon the nature of the particular modifying agent, and depending on the desired properties of the final product, it may be more desirable to add the modifying agent at a later stage in the process. For instance, anionic-functional group modifying agents may in some cases be adversely affected by the acid catalyst in the polymerization step. Thus, as hereinafter discussed, the modifying agent may be added subsequent to the polymerization stage.

Next, the emulsion containing the modifying agent is introduced to the polymerization reactor 30 along with an amphiphilic, acidic polymerization catalyst, having an ionization constant greater than about $10^{-4}$, which is introduced by means of line 32. Suitable polymerization catalysts for the purpose of the present invention include, for example, polymerization catalysts that are soluble in the continuous oily phase, but which have a significant affinity for the internal, or water phase, such as anhydrous hydrochloric acid, $SO_2$, $SO_3$, $BF_3$, $BF_3$etherate, titanium tetrachloride, phosphoric acid, phosphorous pentachloride, silicontetrachloride, phosphorous trichloride, sulfuryl chloride, and the like; organic carboxylic acids such as formic acid, acetic acid, trichloroacetic acid, and the like; alkyl acid phosphates, such as monoethyl acid phosphate, monoamyl acid phosphate, monobutyl acid, diethyl acid phosphate, and the like; substituted sulfamic acids, etc. Preferably, the acid catalyst is employed in amounts necessary to bring the final pH of the prepolymer phase to a pH of between about 0.5 and about 4, preferably between about 1 and about 2.

The catalyst is added at about ambient temperatures under mild agitation, preferably in the temperature range of about 10° to about 25° C. The polymerization reaction is exothermic, resulting in a temperature rise, so that the polymerization reaction occurs at temperatures in the range of between about 30° and about 70° C., preferably in the range of between about 40° and about 50° C. Since the acid-catalyzed condensation polymerization is exothermic, cooling means (not shown) must be utilized in connection with reaction 30 in order to keep the polymerization temperatures in the preferred range. Accordingly, costly heating means for reactor 30 are not needed. The polymerization reaction is conducted for between about 0.25 and about 4 hours, preferably between about 0.5 and about 2 hours.

As employed herein, the term "amphiphilic catalyst" means that the catalyst possesses at least some significant affinity for both the aqueous and the oily phase of the emulsion, and thus is neither completely hydrophilic nor completely oleophilic. The employment of an amphiphilic polymerization catalyst permits the addition of said catalyst after the formation of the emulsion, since it is capable of passing through the continuous solvent phase to the water-oil interface, effectively catalyzing the polymerization of the urea-formaldehyde. Thus, the use of such catalysts permits the control of the emulsification operation including the emulsion droplet size without concern of any premature gelling, which might occur if a catalyst were introduced into the prepolymer solution before emulsification. Another advantage of suing such a catalyst is that it will not prematurely precipitate any added inorganic opacifying pigments, such as titanium dioxide, out of the emulsion, which could occur if a water-soluble acid polymerization catalyst were added along with the aqueous, internal phase prior to the formation of the emulsion.

A dispersion of the polymerized urea-formaldehyde particles and water droplets in the water-immiscible oily solvent, i.e., a "solvent dispersion", is withdrawn from reactor 30 by means of line 34.

The modifying agent if not added previously, may be added by means of line 33. When added at this stage, the modifying agent will react with the previously polymerized particles. It should be noted that due to the presence of unreacted catalyst and the addition of heat in later stages, the polymerization of the aldehyde condensation polymer may not be completed at this stage of the process.

Next, the "solvent dispersion" is passed to a vessel 36 by means of valve 35 and line 37. In vessel 36 the solvent dispersion is separated into a substantially clear supernatent phase comprising the oily solvent, e.g., xylene, and most of the emulsifying agent. This phase is removed from vessel 36 by means of the line 40. The remaining phase is a heavy phase which comprises residual solvent and the solid polymer particles. The heavy phase is termed an "inverted sludge" phase, since the system fed to the vessel 36 had been in the form of a water-in-oil emulsion, and the system has now inverted to an oil-in-water emulsion.

The phase separation in vessel 36 may be accomplished by various means including heating the solvent dispersion to a temperature, for example, in the range of between about 35° and about 70° C., preferably between about 40° and about 50° C. Alternatively, the solvent dispersion may be subjected to direct centrifugation. Still another means for effecting the phase separation is by diluting the solvent dispersion by addition of solvent, e.g., xylene, by means of process line 38. The phase separation can also be accomplished by subjecting the solvent dispersion to high shear mixing. In any event, after treatment, the solvent dispersion is subjected to settling and decantation or centrifugation (by conventional means not shown). Regardless of the phase separation means employed, it is important to retain at least a small amount of the solvent, e.g., xylene, in the inverted sludge. Suitable amounts include between about 0.2 and about 2, preferably between about 0.5 and about 1 part by weight solvent per part of polymer solids.

As previously indicated, the supernatent liquid comprising the solvent and most of the emulsifying agent is withdrawn from the separator 36 by means of line 40 and the solvent is passed to a recovery system 42 which includes a liquid-liquid separator wherein the organic solvent is separated from residual water and catalyst and recycled by means of line 44 for admixture with a solvent make-up present in line 10. Thus, in this manner the solvent or external phase may be easily recovered without the use of exotic recovery equipment normally associated with the collection of volatilized solvents, and may be easily recycled for reuse in the process.

Water is withdrawn from recovery system 42 by means of line 46 and may be subjected to waste treatment for recycle of the water for use in the process, or alternatively, the water may be passed to disposal.

The resultant inverted sludge containing solid polymerized particles is withdrawn from the separator 36 by means of line 48, and the particles may be passed by means of valve 50 and line 52 to drier 54 wherein residual solvent is removed and the particles are obtained in line 56 in a dry randomly agglomerated form. If the acidic catalyst present in the inverted sludge in line 52 is neutralized by addition of a base, such an alkali metal hydroxide, such as sodium hydroxide, introduced by means of line 53, the resultant dried particles are substantially discrete when removed from drier 54. However, care must be exercized in choosing a neutralization agent that the functional portion of the modifying agent not be adversely effected. The resultant particles have an average particle size of below about 2 microns, preferably between about 0.5 and about 1.0 microns and may be employed as opacifying pigments, to provide a relatively high opacity in the form of an opaque coating which is white, in the case or urea-formaldehyde.

According to another and more preferred aspect of the present invention, the solid polymeric particles present in the inverted sludge are withdrawn from separator 36 by means of line 48, three-way valve 50 and, line 58 and are passed to solvent removal tank 60, wherein an aqueous liquid such as water is introduced by means of line 62 for diluting the inverted sludge and further removal of the water-immiscible organic solvent. The polymeric particles in vessel 60 are subjected to agitation and heating either directly employing live steam or indirectly using conventional heating means to a temperature in the range of between about 120° and about 250° F., preferably between about 190° and about 212° F. for the removal of residual solvent by steam distillation, and to provide additional acid-catalyzed curing of the polymeric particles. Surprisingly, under the influence of shear, acid and heat dispersion of the polymeric particles in the aqueous medium results in the formation of substantially spherically agglomerated, chemically modified, opacifying particles wherein the walls of the particles are themselves formed of chemically modified microspheres. Temperatures, for example, in the range of between about 120° and about 250° F. are utilized to "set" the spherical agglomerate structure. Once the formation of spherically agglomerated opacifying particles has been achieved, residual oily solvent can be removed at lower temperatures under reduced pressure if desired, with no impairment of the opacifying power of the final product. The structure of the resulting agglomerated particles are illustrated in FIG. 2 of the drawings.

Alternatively, the solvent dispersion from the Reactor 30 can be discharged through line 34 through valve 35 and line 39 to line 58 and into vessel 60 where water is added (line 62) and the mixture agitated under high shear to form an oil-in-water emulsion. The oily solvent is then removed by steam distillation, as described in the preceeding paragraph, to produce the spherically agglomerated particles illustrated in FIG. 2.

FIG. 2 is a photomicrograph illustrating the nature of a preferred, chemically modified opacifying particle of the present invention which may be termed a "super-agglomerate", since it is composed of a shall formed of agglomerated secondary particles, which are themselves formed of clusters of substantially spherical primary particles. As seen in FIG. 2., the super-agglomerated is hollow on the inside of the outer shell. Although it is not intended to limit the invention to any particular theory, it is believed that the secondary particles are derived from the polymerization of an aqueous prepolymer droplet. Thus, the size of the secondary particles is controlled by the droplet size of the initial water-in-oil emulsion droplets formed during the initial emulsification step. The aqueous redispersion system in vessel 60 involves an oil-in-water emulsion with the secondary particles concentrated at the solvent-water interface. The subsequent heating of this material during the initial phase of the distillation step results in the post-curing and fusion of the particles into a rigit substantially spherical structure.

The secondary, chemically modified particles are irregular and bumpy and are composed of smaller, chemically modified primary particles. Although the primary, chemically modified particles have been described as substantially spherical, with increased formaldehyde-to-urea ratio this differentiation becomes less distinct, so that the secondary particles have a smoother, only slightly pebbled surface. FIG. 3 is a sectional photomicrograph illustrating the interior of a super-agglomerate and demonstratesthat the particles are hollow.

The super-agglomerate, chemically modified particles have an opacity which provides a two- to three-fold increase of that of the discrete, substantially spherical, chemically modified primary particles that are withdrawn by means of line 52, which particles have not been subjected to heating under shear. The super-agglomerates have an average particle diameter of between about 1 and about 20 microns, preferably between about 2 and about 7 microns.

Solvent vapor is steam distilled from the solvent removal vessel 60 in the form of a mixture of residual xylene with water by means of line 63 and passed through a condensor (not shown) and then on to join process line 40. Meanwhile, the aqueous dispersion of the substantially spherical, chemically modified agglomerates is withdrawn from vessel 60 by means of line 64 and valve 66 and is withdrawn by means of line 68. The aqueous slurry that is withdrawn by means of line 68 may be employed as a coating for the direct application of the chemically modified opacifying agents onto the desired substrate, such as paper, with the incorporation of a suitable binder material. The resulting substrate is then dried under conventional paper drying conditions for removal of the moisture and the resulting coated substrate has a high degree of opacity. The Kubelka-Munk light scattering coefficient of such a coating formulated from 100 parts by weight of these pigment particles and 10 parts by weight of a conventional paper coating binder is between about 2,000 and about 6,000 cm$^2$ per gram. Likewise, the resulting slurry may be incorporated in a surface finish, such as paint, to provide a high degree of opacity thereto.

Alternatively, the aqueous slurry withdrawn from vessel 60 by means of line 64 may be passed by means of line 70 to a solid-liquid separator 72, such as, for example, a centrifuge, for water removal by means of line 74, and the resultant particles may be passed by means of line 76 to dryer 54 in order to produce chemically modified agglomerates in powder form. It has been found that the adjustment of the pH to a value greater than 8 prior to drying greatly facilitates the production of a free- flowing, non-caking powder during the drying process. The resultant chemically modified polymeric opacifying agents may be incorporated in paint or may be redispersed in a suitable aqueous or non-aqueous liquid with the addition of a binder and employed in the coating of paper or some other substrate, such as plastic, fabric or textile webs wherein it is desired to increase the opacity of such substrate. If desired, the product from line 76 can be passed to line 77 to wash tank 78 for washing to remove residual emulsifying agents by resuspending it in additional water in vessel 78. The washed super-particles are then passed by means of line 79 to separator 72.

These organic opacifying pigment particles in the form of the aqueous slurry from line 68, the wet cake from line 76, or the dry powder from line 56 can also be added to paper furnish, that is, the slurry of cellulose pulp fibers, sizing agents and other additives, and used to produce paper by conventional paper-making techniques, providing a paper with greatly increased opacity.

It has been found that the incorporation of cationic-functional groups into the opacifying particle or agglomerate results in a particle which exhibits improved retention to cellulose fibers. Likewise, the inclusion of anionic- or hydroxy-functional groups into the opacifying agent will result in greater retention to other substrates, depending on the properties thereof.

As mentioned before, the chemically modified opacifying particles exhibit improved dye receptivity, are more easily dispersed in, for instance, paints or binders, and are more compatible with a wide range of solvents and other polymer systems.

The following examples illustrate the production of the chemically modified opacifying pigments of the present invention and constitute the best modes contemplated for carrying out the present invention.

EXAMPLE 1

Anionic-functional group modified opacifying agents are prepared as follows.

Eighty-nine grams of urea are added to a solution of 165 grams of 37% aqueous formaldehyde and 45 grams of water, adjusted to pH 9.3 with NaOH and heated for one hour at 65° C. to yield a prepolymer solution containing about 50% of solids. Using a Waring Blender, 140 grams of this prepolymer solution are emulsified in a solution of 6 grams of a polyethylene oxide-polypropylene oxide block copolymer ("Pluronic L 122" from BASF- Wyandotte Company) emulsifier dissolved in 100 grams of toluene to produce a low-viscosity water-in-oil emulsion.

Two grams of glutamic acid are neutralized with 10% NaOH and the resultant material is added to the emulsion.

The emulsion then is treated with 4 milliliters of a 33% by weight solution of titanium tetrachloride in toluene, resulting in an exothermic reaction with raises the temperature from about 28° to about 50° C. After stirring for 2 hours, the resulting "solvent dispersion" consists of water droplets and solid polymer particles dispersed in the oil phase, with little or no tendency for coagulation of the polymer particles. This is separated into a clear supernatent phase, containing the oily solvent and some of the emulsifying agent, and a heavier phase, the "inverted sludge", containing about 40% solids and about 20% oily solvent. The phase separation is accomplished by centrifugation. The inverted sludge is redispersed in about 200 grams of water and is subjected to high-shear agitation while heating to steam distill off the oily solvent as a mixture with a portion of the excess water.

The resulting product is free of toluene and consists of an aqueous dispersion of 0.25 to 2 μ polymer particles, which have fused together into substantially spherical agglomerates (super particles) 1 to 5 μ in diameter. The cationic super particles are readily dispersed into a carboxylated styrene-butadiene rubber (SBR) latex paper coating adhesive (DOW 620 SBR latex, 10 parts by weight latex solids to 100 parts polymer solids) and coated on a paper substrate.

The Kubelka-Munk scatter coefficient of the paper coating is measured using a Huygen model 2100 digital opacimeter and computational methods described in the literature. A scatter coefficient of approximately 3650 cm$^2$/gram is obtained. Formulated and coated under the same conditions, a water-dispersible paper coating grade of anatase TiO$_2$ gives coatings with a scatter coefficient of 3800 to 4000 cm$^2$/gram.

EXAMPLE 2

Anionic opacifying agents are prepared as follows.

140 grams of prepolymer solution are prepared and mixed with 100 grams of toluene and 6 grams of "Pluronic L 122" as in Example 1.

Three grams of 7-amino-1,3-naphthalene disulfonic acid (70% solids) are dissolved in 5 grams of 10% aqueous sodium hydroxide solution and the resultant solution is admixed with the prepolymer emulsion.

Sixty milligrams of sulfur dioxide are added and the temperature increases to 40° C. The reaction is maintained for 2 hours. The heavier inverted sludge phase is separated and dispersed in water. The dispersion is steam distilled under high shear agitation. The resultant anionic-functional opacifying agents exhibit a yellowish color which may be partially removed during subsequent water washing.

The scatter coefficient of the agglomerates is 3550.

EXAMPLE 3

Cationic-functional opacifying agents are prepared from 140 grams of urea-formaldehyde prepolymer solution, 100 grams of xylene, 6 grams of a polyethylene oxide-polypropylene block copolymer attached to a central amine group (Tetrionic 1502 from BASF-Wyandotte Company) and 0.70 grams of guanidine nitrate using the procedure of Example 1.

After steam distillation and washing the agglomerates have an average light scattering coefficient of 4200 cm$^2$/gram.

Example 4

Cationic-functional agglomerates are prepared as in Example 3 but using 3½ grams guanidine nitrate.

After steam distillation and washing the agglomerates have an average light scattering coefficient of 4000 cm$^2$/gram.

What is claimed is:

1. In a process for the preparation of substantially spherical, opacifying particles, which process comprises admixing an aqueous, partially condensed, aldehyde condensation product with an oily material and a surface-active emulsifying agent to form a water-in-oil emulsion, admixing an amphiphilic acid catalyst with said emulsion and polymerizing said aldehyde condensation product in a polymerization zone to form substantially spherical, polymerized particles, the improvement comprising reacting a modifying agent with said aldehyde condensation product, said modifying agent being capable of imparting cationic-, anionic- or free hydroxy-functional groups to said aldehyde condensation product, said modifying agent being added to the system subsequent to the formation of said water-in-oil emulsion.

2. The process of claim 1 wherein said modifying agent is added to said system prior to said admixture of said amphiphilic catalyst with said emulsion.

3. The process of claim 1 wherein said modifying agent is added to said system after said aldehyde condensation product leaves said polymerization zone.

4. The process of claim 2 wherein said modifying agent is water insoluble.

5. The process of claim 1 wherein said modifying agent possesses both hydrophilic and oleophilic moieties.

6. The process of claim 1 in which the modifying agent is capable of imparting anionic-functional groups to the aldehyde condensation product.

7. The process of claim 6 wherein said modifying agent is an amino sulfonate.

8. The process of claim 1 wherein said modifying agent is capable of imparting cationic-functional groups to the aldehyde condensation product.

9. The process of claim 8 wherein said modifying agent is guanidine nitrate.

10. The process of claim 1 wherein said modifying agent is capable of imparting hydroxy-functional groups to the aldehyde condensation product.

11. The process of claim 10 wherein said modifying agent is glycerine.

12. The process of claim 1 wherein said aldehyde condensation product is urea-formaldehyde.

13. The process of claim 1 wherein said polymerized particles are treated with a dyeing agent.

14. A cellulosic substrate having a coating thereon of microscopic particles having been modified with cationic-functional groups prepared according to the process of claim 8.

* * * * *